(12) United States Patent
Capobianco et al.

(10) Patent No.: US 6,639,959 B1
(45) Date of Patent: Oct. 28, 2003

(54) GUIDE TUBE CAMERA INSPECTION FIXTURE AND METHOD OF USE

(75) Inventors: Joseph J. Capobianco, Trumann, AR (US); Michael L. McDonald, Antioch, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/063,634

(22) Filed: May 6, 2002

(51) Int. Cl.[7] .............................................. G21C 17/00
(52) U.S. Cl. ...................................... 376/248; 376/258
(58) Field of Search ................................. 376/248, 249, 376/252, 258; 73/623; 356/241.1

(56) References Cited

U.S. PATENT DOCUMENTS

| | | | | |
|---|---|---|---|---|
| 3,764,736 A | * | 10/1973 | Kosky et al. | ............... 376/248 |
| 4,689,994 A | * | 9/1987 | Savinell et al. | ............. 376/249 |
| 4,752,127 A | * | 6/1988 | Zafred | ......................... 376/248 |
| 5,078,955 A | * | 1/1992 | Hydeman et al. | ........... 376/248 |
| 5,467,640 A | * | 11/1995 | Salinas | .................... 73/40.5 R |
| 6,111,600 A | * | 8/2000 | McLeod et al. | .............. 348/84 |

FOREIGN PATENT DOCUMENTS

JP      10191522 A   *   7/1998

* cited by examiner

*Primary Examiner*—Daniel Matz
(74) *Attorney, Agent, or Firm*—Armstrong Teasdale LLP

(57) ABSTRACT

A guide tube inspection camera fixture for inspecting internal surfaces of nuclear reactor control rod guide tubes is provided. In an exemplary embodiment, the guide tube camera fixture includes a base plate, a unit-body tower having a first end and a second end, and a support bracket coupled to the unit-body tower. The unit-body tower is coupled to the base plate, and the support bracket is configured to support an inspection camera.

23 Claims, 2 Drawing Sheets

GUIDE TUBE CAMERA INSPECTION FIXTURE AND METHOD OF USE

BACKGROUND OF THE INVENTION

This invention relates generally to nuclear reactors and more particularly, to a control rod guide tube inspection camera fixture and method of inspecting control rod guide tubes in a nuclear reactor.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

The core of the reactor includes an array of fuel bundles with square cross section. The fuel bundles are supported from below by a fuel support. Each fuel support supports a group of four fuel bundles. The heat generated in the core can be decreased by inserting control rods into the core, and the generated heat can be increased by retracting control rods from the core. In some BWR's, the control rods have a cruciform cross section with blades that can be inserted between the fuel bundles of a group of four.

The control rods are driven by control-rod drives that extend through the bottom of the reactor vessel. The control-rod drives are supported by control-rod-drive (CRD) housings, which are tubes that extend through the vessel bottom. The CRD housings support control-rod guide tubes (CRGTs) that help guide the vertical movement of the control rods. The fuel supports are seated on the CRGTs.

Internal structures of operating BWRs are susceptible to various corrosive and cracking processes. Stress corrosion cracking (SCC) is one known phenomenon occurring in reactor components, such as structural members, piping, control rod guide tubes, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Internal structures of BWR's susceptible to corrosive and cracking process are typically inspected during reactor shutdown periods. Inspections can include ultrasonic inspections and visual inspections utilizing a camera. Typically, cameras are operated by hand by workers that have descended underwater into the reactor. This method of visual inspection is time consuming because of the limited time workers can stay inside the reactor. Also, because of water flow, sometimes caused by water thermals, and the hand held method of camera usage, the quality of the camera shots can vary. Sometimes the camera shots are unacceptable, and workers must repeat the visual inspection and regenerate the unusable camera shots. Repeating portions of the inspection lengthens the down time of the reactor and causes higher maintenance costs.

SUMMARY OF INVENTION

In one aspect, a guide tube inspection camera fixture for inspecting internal surfaces of nuclear reactor control rod guide tubes is provided. The guide tube camera fixture includes a base plate, a unit-body tower having a first end and a second end, and a support bracket coupled to the unit-body tower. The unit-body tower is coupled to the base plate, and the support bracket is configured to support an inspection camera.

In another aspect, an inspection camera assembly for inspecting internal surfaces of nuclear reactor control rod guide tubes is provided. The inspection camera assembly includes an inspection camera coupled to a camera fixture assembly. The guide tube camera fixture includes a base plate, a unit-body tower having a first end and a second end, and a support bracket coupled to the unit-body tower. The unit-body tower is coupled to the base plate, and the support bracket is configured to support an inspection camera.

In another aspect, a method of visually inspecting internal surfaces of nuclear reactor control rod guide tubes is provided. The method includes inserting an inspection camera assembly into a guide tube to a predetermined position, and taking photographs of an inside surface of the guide tube. The inspection camera assembly includes a base plate, a unit-body tower having a first end and a second end, the unit-body tower coupled to the base plate, and a support bracket coupled to the unit-body tower, the inspection camera coupled to the support bracket.

DETAILED DESCRIPTION

A guide tube inspection camera fixture apparatus for inspecting internal surfaces of nuclear reactor control rod guide tubes is described below in more detail. The fixture supports an underwater camera used for the inspections. The camera is held in a fixed position which eliminates the need for a worker to hold the camera, and provides camera stability during the visual inspection process. The camera fixture provides for quality camera shots by negating the effects of water flow, water thermals, and hand held camera usage. Also, because there are no moving parts, foreign material exclusion is greatly reduced, and the number of crevices which trap contaminates is also reduced. The guide tube inspection camera fixture apparatus is manufactured from any suitable material, for example, aluminum, steel, stainless steel, and engineered plastic materials.

Figure 1:
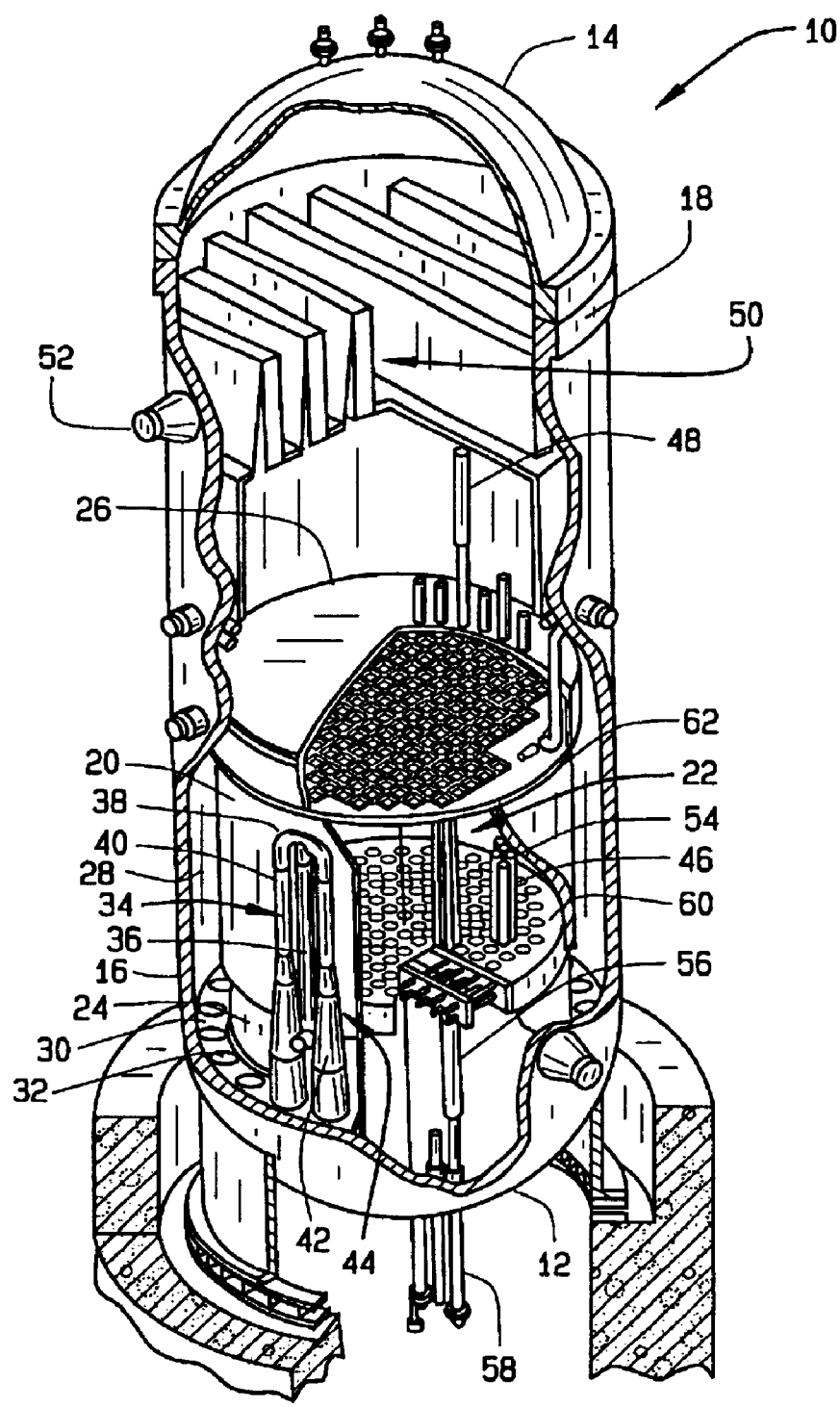
FIG. 1 is a sectional view, with parts cut away, of a boiling water nuclear reactor pressure vessel.

Referring now to the figures, FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42. Inlet riser 36 and two connected jet pumps 34 form a jet pump assembly 44.

Heat is generated within core 22, which includes fuel bundles 46 of fissionable material. Water circulated up through core 22 is at least partially converted to steam. Steam separators 48 separates steam from water, which is recirculated. Residual water is removed from the steam by steam dryers 50. The steam exits RPV 10 through a steam outlet 52 near vessel top head 14.

The amount of heat generated in core 22 is regulated by inserting and withdrawing control rods 54 of neutron absorbing material, such as for example, hafnium. To the extent that control rod 54 is inserted into fuel bundle 46, it absorbs neutrons that would otherwise be available to promote the chain reaction which generates heat in core 22.

Control rod guide tubes 56 extend vertically from control rod drives 58 to core support plate 60. Control rod guide tubes 56 restrict non-vertical motion of control rods 54 and also maintain the vertical motion of control rods 54 during insertion and withdrawal. Control rod drives 58 effect the insertion and withdrawal of control rods 54. Control rod drives 58 extend through bottom head 12.

Figure 2:
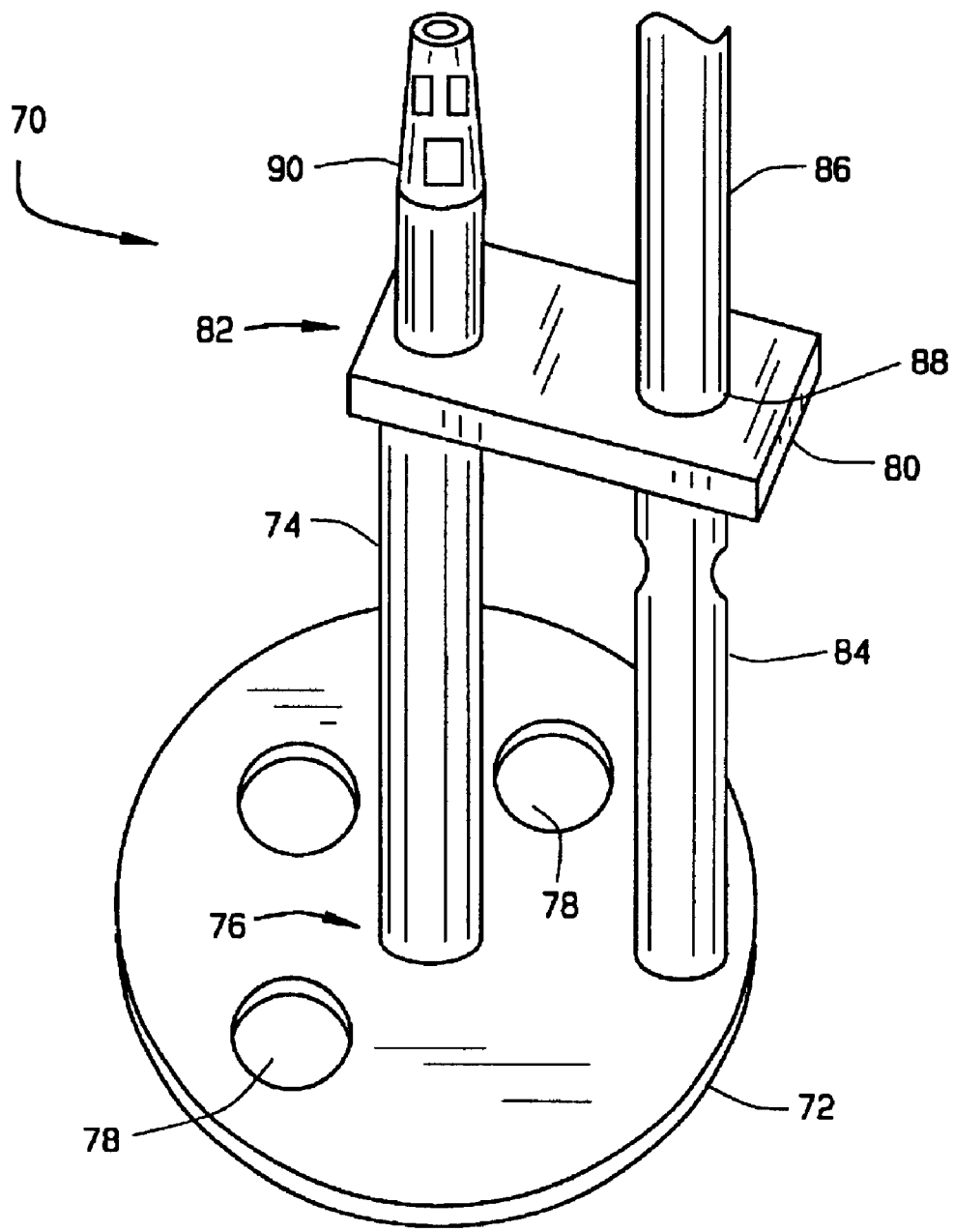
FIG. 2 is a perspective view of an inspection camera fixture apparatus in accordance with an embodiment of the present invention.

Fuel bundles 46 are aligned by a core plate 60 located at the base of core 22. A top guide 62 aligns fuel bundles 46 as they are lowered into core 22. Core plate 60 and top guide 62 are supported by core shroud 20. FIG. 2 is a perspective view of an inspection camera fixture apparatus 70 in accordance with an embodiment of the present invention. In an exemplary embodiment, inspection camera fixture apparatus 70 includes a base plate 72 and a unit-body tower 74 coupled to base plate 72. Specifically, a first end portion 76 of unit-body tower 74 is coupled to base plate 72 so that unit-body tower 74 is substantially perpendicular to base 72. Base plate 72 and unit-body tower 74 can be coupled together by any suitable method. In the exemplary embodiment, unit-body tower 74 is coupled to base plate 72 by welding. In another embodiment, unit-body tower 74 is coupled to base plate 72 by fasteners. In still another embodiment, first end 76 portion of unit-body tower 74 includes threads that engage a threaded bore in base plate 72. In the exemplary embodiment, unit-body tower 74 is welded to the center of base plate 72. However, in alternate embodiments, unit-body tower 74 is coupled to an area of base plate 72 other than the center. Base plate 72 is sized and shaped to be received in control rod guide tubes 56. In the exemplary embodiment, base plate 72 is circular. However, in alternate embodiments, base plate 72 has a shape that matches the shape of guide tube 56, for example a cruciform shape, a rectangular shape, a Y-shape, and any other suitable polygonal shape. Also, a plurality of openings 78 extend through base plate 72 A support bracket 80 is coupled to a second end portion 82 of unit-body tower 74. Support bracket 80 extends from unit-body tower 74 so that support bracket 80 is substantially parallel to base plate 72.

Support bracket 80 and unit-body tower 74 can be coupled together by any suitable method. In the exemplary embodiment, support bracket 80 is coupled to unit-body tower 74 by welding. In another embodiment, support bracket 80 is coupled to unit-body tower 74 by fasteners and/or clamping elements. In still another embodiment, second end portion 80 of unit-body tower 74 includes threads that engage a threaded bore in support bracket 80.

An inspection camera 84 is coupled to support bracket 80. An input/output cable 86 is attached to inspection camera 84. Inspection camera 84 is positioned between support bracket 80 and base plate 72. A bore 88 extends through support bracket 80. Bore 88 is sized to receive inspection camera 84. Inspection camera 84 is secured to support bracket 80 by any suitable method. In one embodiment, set screws extend through support bracket 80 and engage camera 84 inside bore 88. In another embodiment, camera 84 has a threaded end portion and bore 88 includes threads sized to threadedly engage the threaded end portion of camera 84.

A lifting device adapter 90 is attached to second end portion 80 of unit-body tower 74. Lifting device adapter 90 is configured to couple to a lifting device, for example handling poles, ropes, and remote operated tool manipulators.

Inspection camera fixture apparatus 70 is used for a visual inspection of the inside surface of control rod guide tubes 56. During a shutdown of reactor 10, after control rods 54 are removed from control rod guide tubes 56, apparatus 70 is inserted into one control rod guide tube 56. Particularly, a handling pole (not shown) is connected to lifting device adapter 90 and a worker lowers apparatus 70 into position inside control rod guide tube 56. Inspection camera 84 is activated by a signal carried by input/output cable 86 to camera 84 and camera shots or photographs are taken of the inside surface of guide tube 56. Apparatus 70 can then be rotated to position camera 84 at a new cirumferential position within guide tube 56 before more camera shots are taken. Apparatus 70 can also be raised or lowered to position camera 84 at a new axial position within guide tube 56 before further camera shots are taken. When the inspection of the inner surface of guide tube 56 is complete, apparatus 70 is raised from guide tube 56 and inserted into the next guide tube 56 to be inspected. When the inspection of guide tubes 56 is complete apparatus is raised from reactor core 22 and disconnected from the handling pole.

While the invention has been described in terms of various specific embodiments, those skilled in the art will recognize that the invention can be practiced with modification within the spirit and scope of the claims.

What is claimed is:

1. A guide tube inspection camera fixture for inspecting internal surfaces of nuclear reactor control rod guide tubes, said guide tube camera fixture having no moving parts and configured to be inserted within a guide tube, said fixture comprising:

a base plate;

a unit-body tower having a first end and a second end, said unit-body tower extending from an upper surface of said base plate and maintained in a fixed position relative to said base plate; and a support bracket secured to said unit-body tower and maintained in a fixed position relative to said unit body tower, said support bracket configured to support an inspection camera.

2. A guide tube inspection camera fixture in accordance with claim 1 further comprising a lifting device adapter configured to couple to a lifting device.

3. A guide tube inspection camera fixture in accordance with claim 2 wherein said lifting device adapter is coupled to said first end of said unit-body tower.

4. A guide tube inspection camera fixture in accordance with claim 1 wherein said second end of said unit-body tower is coupled to said base plate at a center of said base plate.

5. A guide tube inspection camera fixture in accordance with claim 4 wherein said unit-body tower is substantially perpendicular to said base plate.

6. A guide tube inspection camera fixture in accordance with claim 1 wherein said base plate is sized and configured to be received inside a guide tube.

7. A guide tube inspection camera fixture in accordance with claim 1 wherein said base plate comprises a plurality of openings extending therethrough.

8. An inspection camera assembly for inspecting internal surfaces of nuclear reactor control rod guide tubes, said assembly comprising an inspection camera coupled to a camera fixture assembly, said camera maintained in a fixed position relative to said camera fixture assembly, said camera fixture assembly having no moving parts and comprising:

a base plate;

a unit-body tower having a first end and a second end, said unit-body tower coupled to said base plate; and a support bracket coupled to said unit-body tower, said inspection camera coupled to said support bracket.

9. An assembly in accordance with claim 8 further comprising a lifting device adapter configured to couple to a lifting device.

10. An assembly in accordance with claim 9 wherein said lifting device adapter is coupled to said first end of said unit-body tower.

11. An assembly in accordance with claim 8 wherein said second end of said unit-body tower is coupled to said base plate at a center of said base plate.

12. An assembly in accordance with claim 11 wherein said unit-body tower is substantially perpendicular to said base plate.

13. An assembly in accordance with claim 8 wherein said base plate is sized and configured to be received inside a guide tube.

14. An assembly in accordance with claim 8 wherein said base plate comprises a plurality of openings extending therethrough.

15. A method of visually inspecting internal surfaces of nuclear reactor control rod guide tubes, said method comprising:

inserting an inspection camera assembly into a guide tube to a predetermined position; and taking photographs of an inside surface of the guide tube, the inspection camera assembly comprising a fixture having no moving parts and configured to be inserted within a guide tube, said fixture comprising:

a base plate;

a unit-body tower having a first end and a second end, the unit-body tower coupled to the base plate; and a support bracket coupled to the unit-body tower, the inspection camera coupled to the support bracket.

16. A method in accordance with claim 15 wherein the inspection camera assembly further comprises a lifting device adapter configured to couple to a lifting device.

17. A method in accordance with claim 16 wherein the lifting device adapter is coupled to the first end of the unit-body tower, and inserting an inspection camera assembly into a guide tube to a predetermined position comprises attaching a lifting device to the lifting device adapter and lowering the inspection camera assembly into a guide tube to a predetermined position with the lifting device.

18. A method in accordance with claim 17 wherein the second end of the unit-body tower is coupled to the base plate at a center of the base plate.

19. A method in accordance with claim 18 wherein the unit-body tower is substantially perpendicular to the base plate.

20. A method in accordance with claim 15 wherein the base plate is sized and configured to be received inside a guide tube.

21. A method in accordance with claim 15 wherein the base plate comprises a plurality of openings extending therethrough.

22. A method in accordance with claim 15 wherein taking photographs of an inside surface of the guide tube comprises:

taking a photograph of the inside surface of the guide tube at a first location;

repositioning the inspection camera apparatus inside the guide tube to a second position; and taking a photograph of the inside surface of the guide tube at the second position.

23. A method in accordance with claim 15 further comprising removing the inspection camera apparatus when taking photographs of the inside surface of the guide tube is complete.

* * * * *